Oct. 22, 1935.  D. C. ABDELNOUR  2,018,338
CONNECTING DEVICE
Filed Nov. 24, 1934
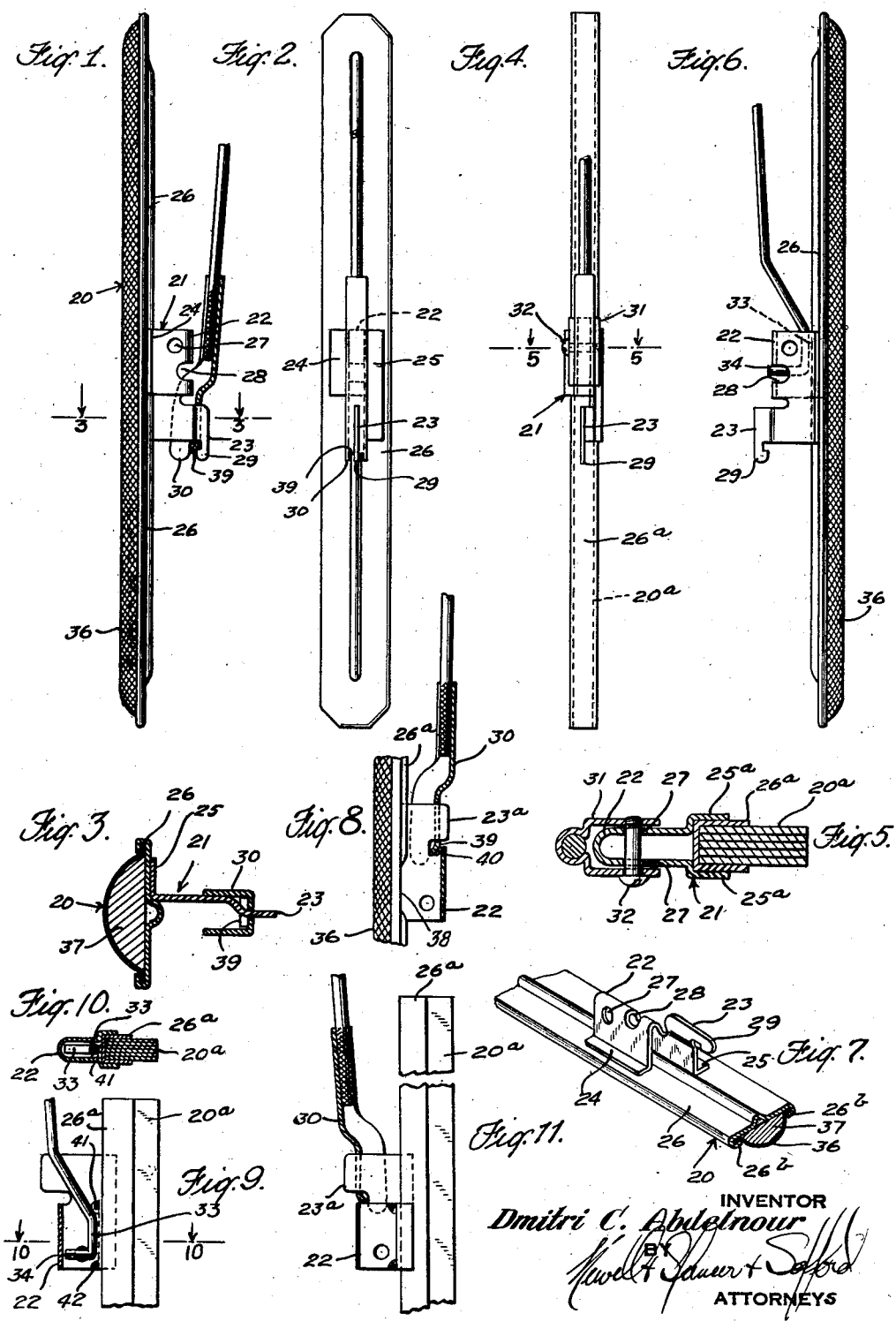

Patented Oct. 22, 1935

2,018,338

UNITED STATES PATENT OFFICE 2,018,338

CONNECTING DEVICE

Dmitri C. Abdelnour, Port Chester, N. Y., assignor to D. A. & H. Corporation, New York, N. Y., a corporation of New York Application November 24, 1934, Serial No. 754,610

3 Claims. (Cl. 15—250)

This invention relates to a connecting device adapted for quick and easy connection and removal. More particularly this invention relates to such a device adapted for connecting blades to the swinging arms of windshield wipers and similar apparatus.

Prior to my present invention a number of devices have been suggested for effecting the connection between the swinging arms and the blades of windshield wipers. Of these, three types have come to be accepted as the standard and are used on nearly all wipers which are now sold. The first of these is the simple bolted connection in which wings are provided on the ends of the swinging arm to fit over the opposite side of the blade and a bolt is inserted through the wings and the back of the blade to hold them in operative relationship. In the second type the end of the swinging arm is formed with a hook, and a saddle member is provided on the back of the blade into which the hooked end of the arm is engaged. The third type consists of a flat hooked fin on the back of the blade and an end member on the swinging arm having a slotted back for reception of the fin and depending ears or wings to engage the sides of the blade. In the past, each of these three types of connections has required a specially made blade, and it has been necessary therefore to stock three types of replacement blades.

It is an object of the present invention to provide an attaching clip adapted for connection with any of the three types of standard wiper arm connections. Another object of the invention is to provide an attaching clip which will be simple and inexpensive and yet entirely efficient and satisfactory in operation.

In the accompanying drawing I have shown a preferred embodiment of my invention adapted to attain these objectives and certain modifications thereof. In these drawings I have shown in:

Figure 1, a side view of a blade having an attaching clip according to my invention, a portion of a swinging arm of a windshield wiper partially in longitudinal section.

Figure 2 is a back view of the same combination as shown in Figure 1.

Figure 3 is a cross-section taken on line 3—3 of Figure 1.

Figure 4 is a view similar to Figure 2 but with a bolted wing type of connection instead of the slot and ear connection.

Figure 5 is a cross section taken on line 5—5 of Figure 4.

Figure 6 is a side view similar to Figure 1 but showing the hooked end type of connection instead of the slot and ear type shown in Figure 1.

Figure 7 is a fragmentary perspective view of the attaching clip and the adjacent portion of the blade without the wiper arm.

Figure 8 is a side view of a modified form of attaching clip also embodying my invention.

Figure 9 is a fragmentary view partially in longitudinal section of another modified form embodying my invention, shown operatively connected with a hooked end type wiper arm.

Figure 10 is a cross-section taken on line 10—10 of Figure 9; and

Figure 11 is a side view of an attaching clip similar to that illustrated in Figure 9 but connected to a slot and ear type wiper arm.

Referring to the drawing in Figures 1 to 3 inclusive and Figures 6, 7 and 8, I have shown the blade as a sleet wiper within the scope of my Patent No. 2,009,377; and in Figures 4, 5, 9 and 11 I have shown the blade as a conventional squeegee type rain wiper. In the case of the sleet wiper blade 20, it is desirable to maintain the blade substantially parallel to the surface of the windshield, and it is preferable therefore, that the attaching clip 21 should be wide enough in outside dimensions to fit closely within the bolted wing, and the slot and ear type of wiper arm so as substantially to eliminate the tendency towards rocking of the blade within its connection. For the same reason it is desirable that the inside dimension should fit closely to the hooked end of the third type of wiper arm. In the case of the squeege blade a rocking or "flopping" action is desirable, and in that case, therefore, the dimensions of the attaching clip are preferably such as to permit substantial play between the attaching clip and the connecting end of the wiper arm. This, however, is not essential and is no part of the present invention, but is merely accepted practice of long standing.

As shown in Figures 1 and 2, the attached clip 21 comprises a single piece of sheet metal, the upper end of which is looped over to form the central connecting portion 22 and the lower part of which is bent to form a central fin or hook 23. The ends of both portions in this form are bent outwardly to form feet 24 and 25 which in this case are spot welded to the back of the blade 26.

As clearly illustrated in Figures 1, 6 and 7, the portion 22 is drilled as indicated at 27 and slotted as indicated at 26 for reception of the bolt or the hooked end of the wiper respectively. The center fin portion 23 as illustrated in these figures is formed with an overhanging hook 29 adapted to engage the end 39 of the wiper arm 30 beyond the slot as clearly shown in Figures 1 and 2.

In Figures 4 and 5 I have shown the attaching clip embodying my invention combined with a bolt and wing type wiper arm. In this case the wing 31 on the end of the wiper arm embraces the portion 22 of the attaching clip and the bolt 32 is inserted through the hole 27 in the attaching clip 21 and is screwed into the wing 31 of the wiper arm, e. g., as shown in Figure 5.

In Figure 6 I have shown the clip of my invention combined with a hooked end type wiper arm. In this case the flat portion 33 of the bottom of the hook bears against the back of the blade 26 and the end of the hook 34 is inserted through the hole 28 in the fold of the loop 22.

In Figures 1 to 3 and 6 to 8 I have shown the attaching clip of my invention on a blade intended for wiping sleet from a windshield. This blade consists essentially of a back 26, the edges of which are rolled over as shown at 26b to engage and secure the edges of a fabric facing 36. A bar of salt or other water soluble material 37 is held within the fabric 36 and in use is pressed against the windshield by the rigid back 26.

In Figures 4 and 5 I have shown the attaching clip combined with a conventional type of squeegee blade 26a in which the rubber squeegee strip is clamped in a metal backing 26a. This backing being substantially narrower than the back 26, the ends of the clip 21 in this case are bent over the sides of the back 26a as shown at 25a and may be spot welded or otherwise secured thereon. These two types of blades are given only as examples of the numerous types to which my invention may be applied and it is to be understood that the invention is not essentially tied up to either of these particular types of blades, but on the contrary, is generally applicable to all wiper blades and similar devices.

In Figure 8 I have shown a modified type of clip in which the hole 28 and the hook on the end of the fin 23 are omitted. Instead of the hole 28 a depression 38 is formed in the back of the blade (26a in this case) into which the flat bottom 33 of the hook on the wiper arm may be fitted. The end 34 of the hook would then be positioned close to the fold of the loop 22 so that the hook cannot be lifted out of the depression 38 except by swinging the blade over the end of the arm substantially the same as in the case of the construction shown in Figure 6. This will be more fully understood with reference to Figure 9 described below.

When the slot and ear type wiper arm is used with this attaching clip, as shown in Figure 8, the end 39 of the wiper arm 30 beyond the slot is engaged under the projection 40 on the portion 22 of the attached clip, thus assuring that the fin 23a can be removed from the slot on the wiper arm only by swinging the blade over the end of the arm in substantially the same way as just described in connection with the hooked end type of arm.

In Figures 9 and 10 a still simpler construction is illustrated. In this case the projection 40 is omitted and instead of the depression 38 formed in the back of the wiper blade a similar effect is obtained by crimping the corners of the portion 22 just above the back of the blade as shown at 41 and 42. These crimps serve to hold the portion 33 on the end of the wiper arm against longitudinal movement within the portion 22 of the clip. In this, as in the case illustrated in Figure 8, the end 34 of the hooked wiper arm is positioned close beneath the fold of the loop 32 so as to prevent the bottom of the hook 33 being lifted above the crimped portions 41 and 42. The action of this clip is substantially identical when combined with the hooked end arm with that of the clip shown in Figure 8. With the slot and ear type of arm, however, the fin 23a engages in the slot on the ends of the arm 30 without any interlocking or hooking action, and consequently the engagement depends upon the resilient pressure of the wiper arm against the blade. This combination is illustrated in Figure 11.

Although I have illustrated in the accompanying drawings and described above a preferred embodiment of my invention and several modifications thereof, it should be understood that these are given only by way of illustration and in order to enable those skilled in the art to use and apply my invention and to adapt it to the varying conditions encountered in actual practice. It should be understood likewise that all such adaptations are within the scope of this application.

What I claim is:

1. In combination with a wiper blade, a universal clip attached to said blade for operative engagement with the swinging arms of windshield wipers of the hooked and slot and ears types, which comprises a single strip of sheet metal folded to form a channel having two sides and a bight portion, the sides being spaced sufficiently for reception of a hooked arm and close enough to permit insertion between ears of a slot and ears type arm and one side having an extension projecting from the end thereof and then outwardly from the line of said bight portion for engagement in the slot of a slotted wiper arm.

2. A clip as defined in claim 1 in which the channel is wide enough to permit flopping of a hooked arm within it and narrow enough to permit its flopping on a bolted or slotted arm.

3. In combination with a wiper blade, a connection adapted for engagement with a wiper arm having a bearing portion to press against the blade and a hooked end portion bent outwardly therefrom away from the blade, which comprises bearing means on the blade adapted to receive pressure from the bearing portion of the wiper arm, a channel member secured to the blade and extended over the bearing means, having the floor of its channel spaced from and parallel to the bearing means and of a size to receive the hooked end of the wiper arm and to limit the lateral movement of, and rotation about an axis longitudinal of, the blade relative to the wiper arm, means positioned to laterally engage the wiper arm at a distance from the end of the hook to hold the blade and arm in substantial alignment, and means on the channel member for limiting the endwise movement of the blade relative to the wiper arm, positioned respectively beyond and before the part of the channel which engages the end of the hook on the wiper arm and the said means which is before the end of the hook being positioned beyond the path of insertion and withdrawal of the hook when the blade is swung away from the wiper arm in their common plane, but blocking the path of removal when the blade is in operative position on the wiper arm.

DMITRI C. ABDELNOUR.